United States Patent [19]

Horton

[11] Patent Number: 4,807,830
[45] Date of Patent: Feb. 28, 1989

[54] AIRCRAFT WITH MAGNETICALLY COUPLED ANNULUS

[76] Inventor: Paul F. Horton, 9393 Hackamore Dr., Boise, Id. 83709

[21] Appl. No.: 941,860

[22] Filed: Dec. 15, 1986

[51] Int. Cl.$^4$ .............................................. B64C 39/06
[52] U.S. Cl. ................................. 244/12.2; 244/23 C; 244/39
[58] Field of Search ..................... 244/12.2, 23 C, 39, 244/17.11; 446/46; 310/90.5

[56] References Cited

U.S. PATENT DOCUMENTS

| | | | |
|---|---|---|---|
| 1,738,611 | 12/1929 | Rasmussen | 244/39 |
| 3,199,809 | 8/1965 | Modesti | 244/12.2 |
| 3,437,290 | 4/1969 | Norman | 244/12.2 |
| 3,599,902 | 8/1971 | Thomley | 244/12.2 |
| 3,632,065 | 1/1972 | Rosta | 244/12.2 |
| 3,946,970 | 3/1976 | Blakenship | 244/23 C |
| 3,997,131 | 12/1976 | Kling | 244/23 C |
| 4,301,981 | 12/1981 | Hartt | 244/12.2 |
| 4,312,483 | 1/1982 | Bosta | 244/12 C |
| 4,433,819 | 2/1984 | Carrington | 244/12.2 |
| 4,452,410 | 6/1984 | Everett | 244/12.2 |
| 4,560,358 | 12/1985 | Adler | 446/46 |

FOREIGN PATENT DOCUMENTS

| | | | |
|---|---|---|---|
| 230204 | 11/1963 | Austria | 244/23 C |
| 2800975 | 7/1979 | Fed. Rep. of Germany | 244/12.2 |

OTHER PUBLICATIONS

Cullum, "Magnetic Bearings" Enginers Digest, Jun. 1978, vol. 39, No. 6, pp. 25,26,30.

Primary Examiner—Galen Barefoot

[57] ABSTRACT

An aircraft comprising an aerodynamic annulus and a fuselage coupled to the annulus by electromagnetic means to permit rotation of the annulus relative to the fuselage without mechanical engagement upon a "frictionless" bearing. Jets mounted on the annulus rotate the annulus to produce a gyroscopic precession. One or more jets or driven propeller units mounted on the fuselage drive the craft in a selected direction. Direction of the fuselage, and hence the aircraft, may be provided by computer control of the fuselage jets or jets or by means of a rudder. Pivotal jets mounted on the annulus and/or fuselage together with retractable flaps on the annulus provide lift for vertical take-off and hovering.

24 Claims, 2 Drawing Sheets

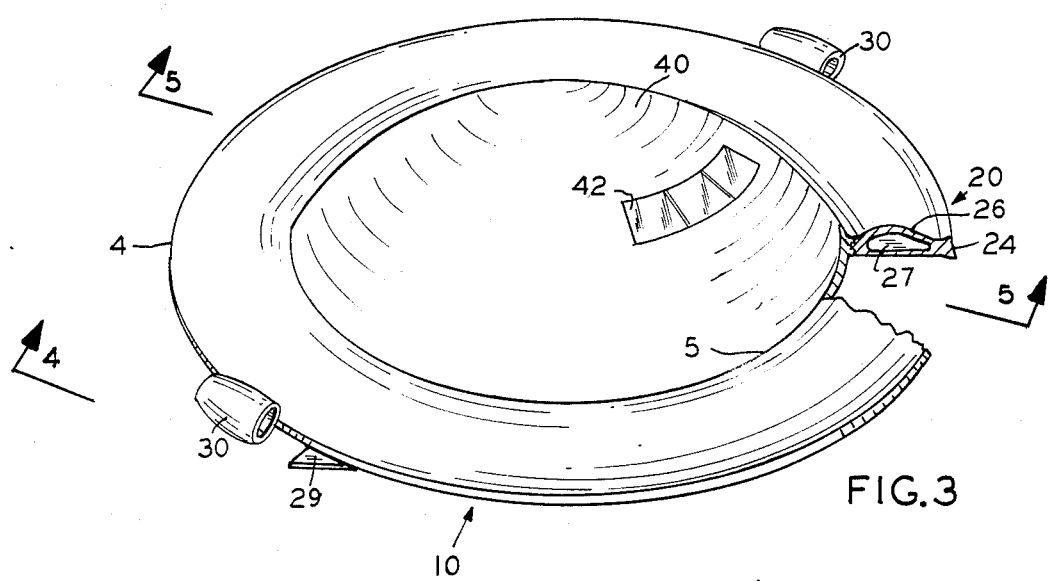
FIG.3
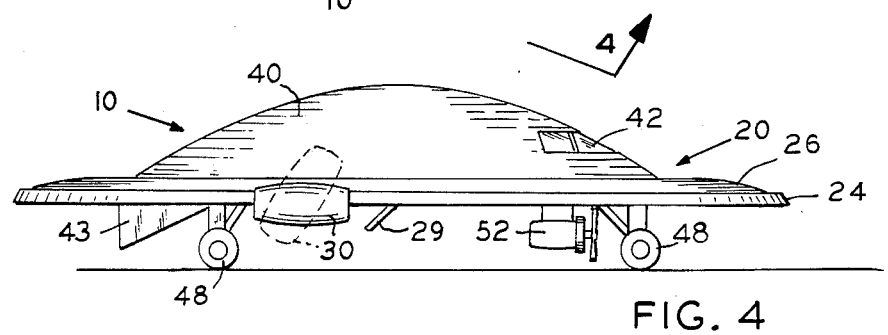
FIG. 4
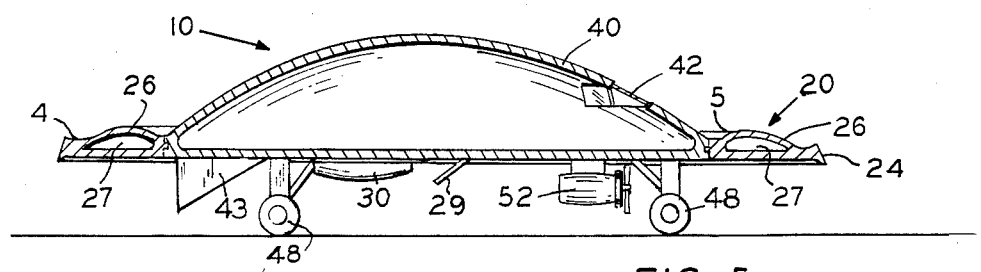
FIG. 5
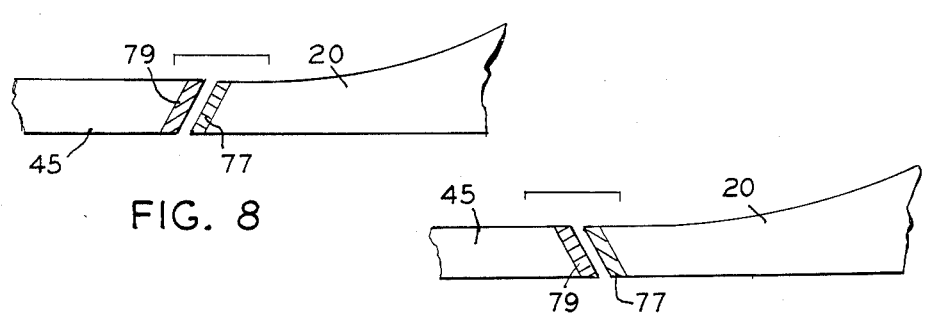
FIG. 8
FIG. 9

AIRCRAFT WITH MAGNETICALLY COUPLED ANNULUS

BACKGROUND OF THE INVENTION

1. Field of the Invention

This invention relates to aircraft in general and more particularly to aircraft having rotating airfoils.

2. Description of the Prior Art

It is highly desirable to produce aircraft which is energy efficient; which is highly maneuverable; which can take off vertically; which can hover; and in which there is no mechanical linkage and therefore no wear between the "rotor" and the main body, i.e., the fuselage of the aircraft.

Flight characteristics of the annulus, also known as the gliding ring, is becoming better known due, in part, to the research of Alan Adler which resulted in production of a ring composed of plastic and rubber and known by the trademark Aerobie ®. U.S. Patents providing disclosure of these rings having highly efficient aerodynamic characteristics for level and lengthy flights include U.S. Pat. Nos. 4,456,265 and 4,560,358. Numerous other patents, some of which are cited in the above enumerated patents, show a large variety of aerial gliding rings. The patents of Adler disclose an aerodynamic annulus having low aerodynamic drag, producing straight and level flight for great distances considering the low propulsive forces involved.

Magnetic levitation, while relatively new in the art of railway transportation, has proven effective at supporting a moving device, i.e., a vehicle, relative to a fixed track or rail, to produce an essentially friction-free levitation system. Two systems are now in use. One system, known as the Maglev system, works on the basis of magnetic attraction and the other system works on the basis of magnetic repulsion. In the first system, electromagnets attached to the vehicle are pulled upward toward an overlying metal rail. Strength of the electromagnetic field is controlled by controlling the current flow through the electromagnets and therefore the gap between magnets and rail can be conveniently controlled. In the repulsive system, now used on levitated trains in Japan, overlying electromagnets affixed to the vehicle induce electric currents in the track coils, causing the track itself to become a temporary electromagnet. The repulsive system generally requires supercold, superconducting electromagnets and is effective only upon movement of the vehicle relative to the track.

Helicopters utilize rotors, i.e., rotating airfoils to produce lift. No aircraft is known which utilizes a rotating annulus, and a rotating aerodynamic annulus, in particular, which is not mechanically connected either directly or indirectly to the fuselage.

Conventional aircraft having low aerodynamic drag either require long take-off and landing strips or must reduce drag by mechanically reducing the airfoil surface during flight. Conventional aircraft which hovers, such as helicopters, are incapable of high speed and current jet propulsion type of hovering aircraft, capable of vertical take-off and landings, are unstable, having no gyroscopic effect, and highly inefficient. No aircraft is known which is capable of hovering and yet accelerating at great speed in any selected direction, and no aircraft is known which has an annulus or rotor which is mechanically disconnected from the main body or fuselage to produce a substantially friction free bearing.

SUMMARY OF THE INVENTION

The present invention overcomes these problems by providing an aircraft which includes an annulus, preferably aerodynamic, rotatable about a fuselage by means of an electromagnetic, friction-free bearing. The annulus is preferably rotated by means of a propulsion system, such as two or more jet engines, which are mounted on the annulus and remotely controlled from the fuselage. The annulus may also be provided with retractable flaps or airfoils for changing the lift characteristics of the annulus. A second propulsion system, mounted to the fuselage, propels the aircraft in a selected direction. The rotating annulus provides a gyroscopic stabilization effect for maintaining the craft in a level position. Directional stabilization may be maintained by computer control of one or more jets comprising the second propulsion system or by a conventional rudder. The craft may also be propeller driven.

It is therefore a primary object of the present invention to provide aircraft which has vertical take-off capabilities; which can hover; which is capable of high speeds; which is highly maneuverable; and which is energy efficient.

It is a fundamental object of the present invention to provide aircraft having an aerodynamic annulus which is rotatable about a fuselage; the fuselage being coupled to the annulus by non-mechanical electromagnetic means.

Many additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 3 is a perspective view of a second embodiment of the present invention, showing the annulus in partial section.

FIG. 4 is a side view of the embodiment shown in FIG. 3.

FIG. 5 is a sectional view taken along lines 5—5 of FIG. 3.

FIG. 8 shows a sectional view of a third embodiment of the electromagnetic coupling.

FIG. 9 shows a sectional view of a fourth embodiment of the electromagnetic coupling.

DETAILED DESCRIPTION OF THE INVENTION

Figure 1:
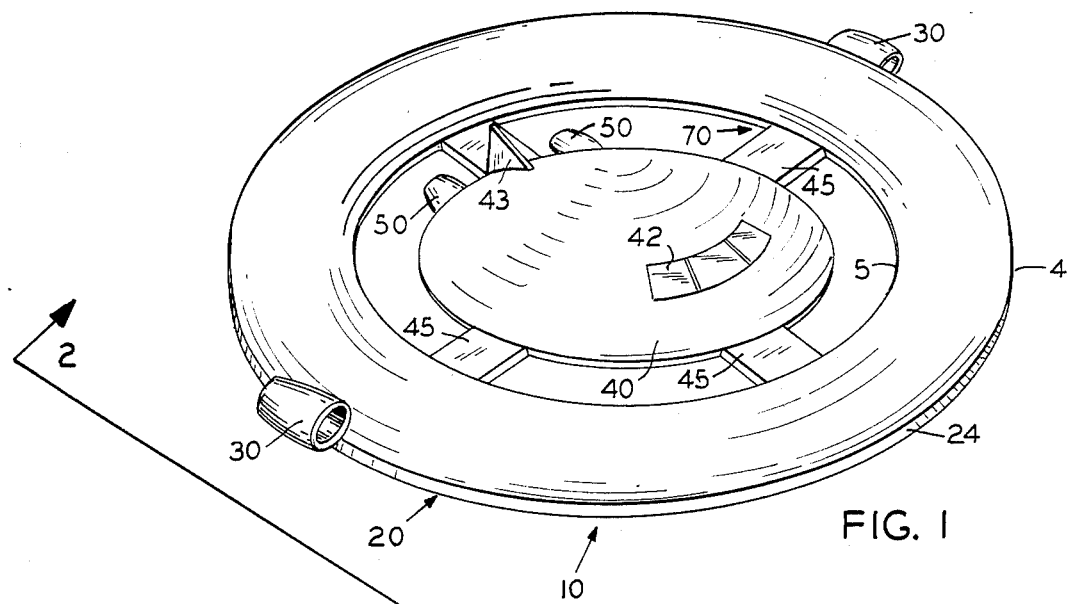
FIG. 1 is a perspective view of a preferred embodiment of the present invention.
Figure 2:
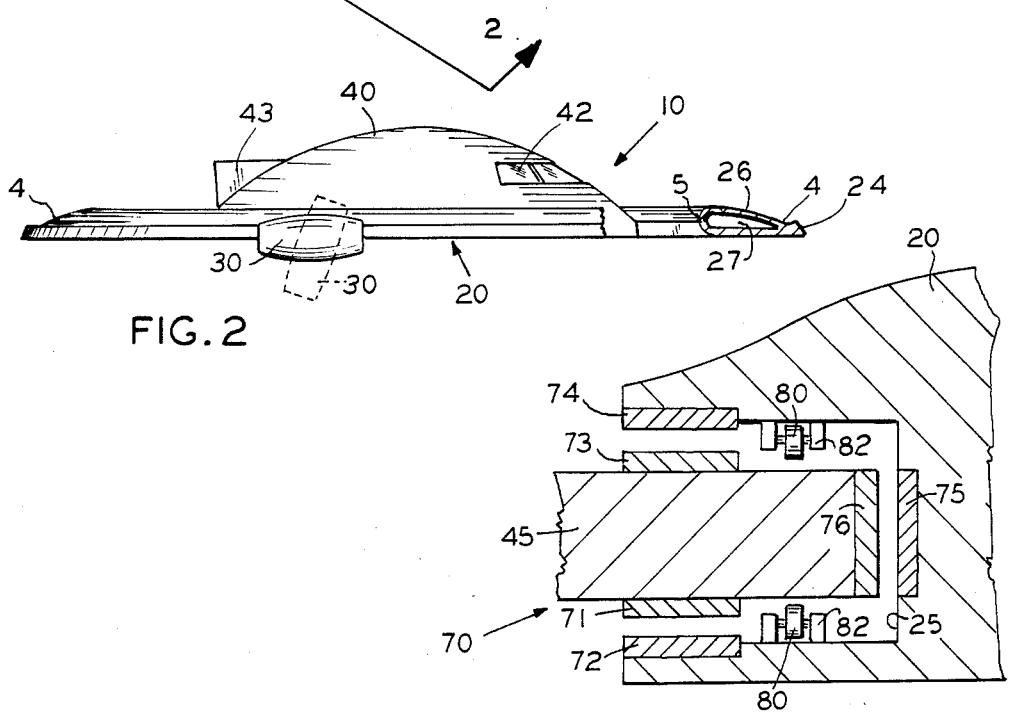
FIG. 2 is a side view, in partial section, of the embodiment shown in FIG. 1, showing landing gear retracted.

Referring now to the drawings and, more particularly, to FIGS. 1 and 2, an embodiment to be preferred of an aircraft 10 made according to the present invention is disclosed. Aircraft 10 includes an aerodynamic annulus 20 carrying first propulsion means 30; a fuselage 40 carrying second propulsion means 50 and electromagnetic means, designated generally by the numeral 70 and seen to advantage in FIG. 6, for coupling the annulus to the fuselage.

Annulus 20 may be of any suitable size and material; the diameter and surface area being dependent upon fuselage size and the desired load and speed characteristics. The annulus is aerodynamic in defining an airfoil. While the lift, drag, and angle of attack of the annulus may be varied to suit the flight characteristics selected, it is preferred that the annulus have a convex upper surface and a substantially planar undersurface and much in the nature of the gliding rings suggested in U.S. Pat. Nos. 4,456,265 and 4,560,358, issued to A. J. Adler. The annulus has a leading edge 4 defined by the outer perimeter of the annulus and a trailing edge 5 defined by the inner perimeter; the leading edge being lower than the trailing edge to provide a negative airfoil angle. Preferably the outer perimeter of the annulus includes a lip 24 which is elevated relative to the adjacent upper surface of the annulus and which may project below the level of the planar undersurface of the annulus, giving additional stability. It is preferred that the lip be beveled outwardly from top to bottom.

Attached to and preferably pivotally engaging annulus 20 are first propulsion means 30. The term "affixed to" as used herein and in the appended claims is to be given a broad definition including attachment to the annulus or fuselage of all or part or the propulsion means. For example, the annulus may be rotated by electromagnets, a portion of which is mounted on the annulus and a portion of which is mounted on the fuselage. It is contemplated that first propulsion means 30 will be in the form of one and preferably two or more jet engines. Where two or more jets are employed, they will be equidistantly spaced about the annulus. The jets may be positioned at the outer edge of the annulus, as shown in FIG. 5. The primary function of the jets is simply to rotate the annulus about an axis perpendicular to the projected plane of the annulus. For this purpose, it is contemplated that engines of low power and hence size may be utilized. The engines are preferably pivotal about a horizontal axis to provide a downward thrust to permit vertical take off and hovering of the aircraft. This function may be aided or replaced by providing pivoting jets on the fuselage. Retractable flaps 29, as shown in FIG. 3, controlled by a conventional hydraulic system, not shown, may also aid in lift or in slowing the rotation of the annulus if and when desired. It is obvious that retractable airfoils, for increasing lift, may also be provided. A cavity 27, defined by the framework and skin 26 of the annulus may be used for fuel storage, for battery storage, for electrical wiring, as well as for fuel pumps and other equipment. It is to be noted that rapid rotation of the annulus provides gyroscopic precession for maintaining the craft in a level, stabilized, position.

Laterally spaced within the central area defined by the annulus is fuselage 40. The fuselage may be of any desired shape, it being contemplated that the fuselage will be circular and therefore equidistantly spaced from the inner perimeter of the annulus, and therefore coaxial therewith. It is also contemplated that the fuselage will have a substantially planar undersurface and a convex upper surface. It is obvious that the fuselage may be shaped to provide an aerodynamic surface area of desired lift characteristics. The fuselage serves to enclose a cargo area, personnel area, fuel storage tank, as well as other necessary and desired equipment, and includes windows 42 for observation, as is conventional. The fuselage, being mechanically separated from the annulus, also carries remote control equipment for activating equipment on the annulus for controlling propulsion means 30, flaps 29, and any other equipment aboard the annulus. It is also contemplated that proper sensors aboard the annulus will relay information to the fuselage regarding fuel supply, battery charge, etc.

The fuselage may have a diameter approximately equal in size as the space defined by the annulus, as shown in FIG. 3, or may be smaller in diameter and provided with a plurality of arms 45 which extend to, but are spaced from, the annulus, as shown in FIGS. 1 and 2. The fuselage is also provided with retractable landing gear 48, shown in FIG. 4, and which is conventional.

Mounted to fuselage 40 is second propulsion means which may be in the form of one or more jet engines 50 or propeller driven units 52. Where jet engines are employed, it is contemplated that the engines will be pivotal about both a horizontal and vertical axis. Vertical pivoting of the engines may complement or replace the lift that may be provided by jet engines 30 on the annulus and in that the fuselage rotates freely relative to the annulus, direction of flight may be controlled by "fine tuning" propulsive force between two or more laterally separated and horizontally pivotal engines or may be controlled by a rudder 43, which may be mounted either above or below the fuselage in a selected location.

Figure 6:
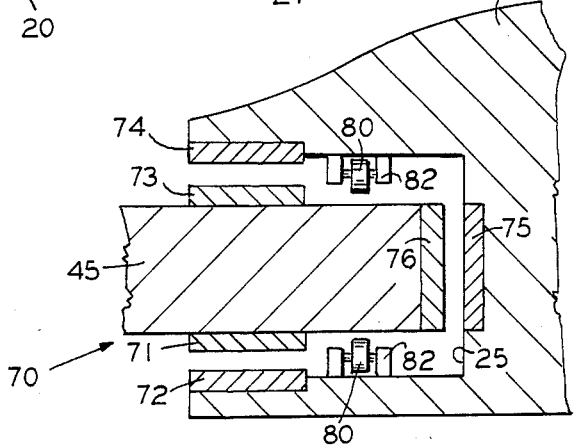
FIG. 6 is a sectional view showing the electromagnetic coupling between fuselage and annulus of the present invention.

Essential to the present invention is electromagnetic means 70, which provide the spaced, non-mechanical, essentially friction-free bearing between the annulus and the fuselage. Referring now to FIGS. 6–9, the relationship between either a fuselage flange or arm 45, electromagnetic means 70, and annulus 20 may be seen to advantage. It is contemplated that either of two systems, i.e., an attraction system or a repulsion system, as before mentioned, may be utilized. Referring to FIG. 6 and assuming an attraction system is used, as is currently used in the Maglev Railway system, structures 72, 74, and 75 represent metal tracks positioned at the bottom, top, and side, respectively, of a recess 25 formed about the inner periphery of the annulus. Structures 71, 73, and 76, in the attraction system, represent electromagnets which are positioned on arm or flange 45 of the fuselage above, below, and inward of the respective tracks. Altering current flowing through each of the electromagnets, alters the strength of the magnetic field of attraction and therefore the gap between the electromagnets of the fuselage and the tracks of the annulus can be adjusted by controlling current flow. It is obvious that tracks and electromagnets may be reversed relative to one another and that any suitable number of electromagnets may be employed.

Where the repulsion type system is used, passive coils, not shown, may be provided in tracks 72, 74, and 75. Electromagnets 71, 73, and 76 induce electric currents in the passive coils of the track as the annulus is rotated about the fuselage, causing the coils and hence the track to become a temporary electromagnet which repulses the electromagnets mounted on the fuselage. Because the induced magnetism is not strong enough at low speeds of rotation, wheels 80 mounted on bearings 82 within recess 25 are provided for support. Such wheel and bearing structure may also be provided in the attraction system to prevent structural damage in case of electromagnetic failure. In the repulsion system, super cooled, supermagnets are preferred.

Figure 7:
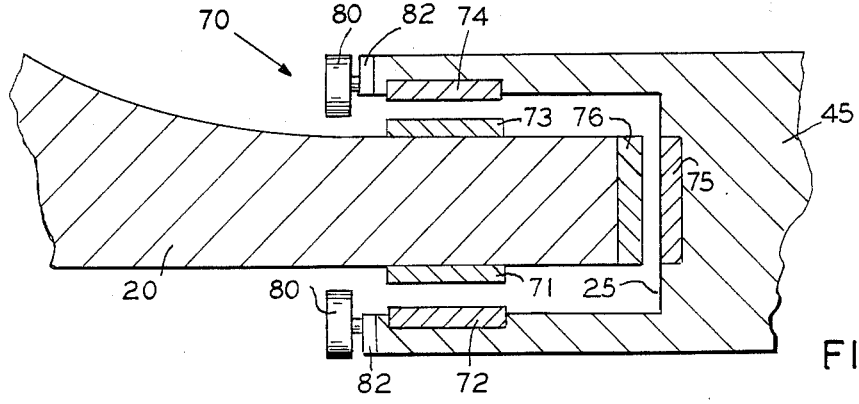
FIG. 7 is a sectional view showing an alternate electromagnetic coupling between fuselage and annulus.

Referring now to FIG. 7, a second embodiment of the electromagnetic means is shown to advantage. Function is identical to the embodiment shown in FIG. 6, but the inner periphery of annulus 20 may maintain its trailing edge integrity in that the flange or arms 45 of the fuselage is recessed rather than the annulus. Structures 72,74, and 75 represent electromagnets on fuselage arm or flange 45 and structures 71, 73, and 76 respective tracks on the annulus.

Referring to FIG. 8, a third embodiment is shown, the third embodiment having but one annular track 77 and one or more electromagnets 79. Track and electromagnets are set an angles relative to one another and to the fuselage and annulus whereby a repulsive force between track and magnets cause the fuselage to be supported upon the annulus; both vertical and lateral support being given because of this arrangement. It is obvious that the track may contain coils within, which produce an opposing induced magnetic field upon rotation relative to the electromagnet, as before described.

FIG. 9 shows a possible system in which track 77 and one or more electromagnets 79 are oriented in an attraction magnet system; the electromagnets being attracted to, and therefore the fuselage lifted toward, the track and therefore the annulus; the amount of lift being altered by the current flow through the electromagnet, as before described. In all of the embodiments, electromagnetic means 70 may be thought of as comprising an electromagnet-track sets. The electromagnet or magnets of each set being coupled electromagnetically to a respective track in either an attraction or repulsion mode. For example in FIG. 6 electromagnet 71 and track 72 comprise one set which is vertically oriented. Electromagnet 73 and track 74 comprising a second vertically oriented set and electromagnet 76 and track 75 comprising a laterally oriented set. The track of each set may be located on either the fuselage or annulus with the electromagnet being located on the other member.

The embodiments shown in FIGS. 8 & 9 include only one set, the track and electromagnets being set obliquely on the fuselage and annulus.

In that both attraction and repulsion systems are well known and in current use in the train levitation art, it is believed that further detailed information is not needed, and that art may be referred to for specifics.

For operation and assuming an operator controlled aircraft which is in the parked, inactive position with landing gear 48 extended and supporting the aircraft 10, the operator, i.e., the pilot, first activates the electromagnetic system 70 to cause current flow through the electromagnets. Jet engines 30 on the annulus and jet engines, or the propeller driven unit, on the fuselage are then activated. Jet engines on either the fuselage or the annulus, or both, may then be pivoted to provide lift to the craft; the craft being kept level by the gyroscopic effect of the rotating annulus. The aircraft may then be driven in any selected direction by controlling the jets or the propeller unit, as the case may be, on the fuselage. Direction may be maintained by controlling the direction of thrust from the jets and/or by use of a rudder. Once sufficient speed is gained in a given direction, lift may be provided solely by the annulus. Sensors, not shown, may detect the amount of gap between electromagnets and tracks and correct current flow may be maintained by use of computers. It is to be noted that the aircraft may accelerate in any selected direction from a hovering position and may also accelerate to a changed direction even at high speeds; the rate of change probably being controlled only by the inertial effects on the personnel. It is also to be noted that in that there is no mechanical connection between fuselage and annulus, small amounts of dust, dirt, or other debris will be without effect on the rotation of the annulus and that no wear will result therefrom.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than be the foregoing description, and all changes which come within the meaning and range of equivalency of the claims are therefore to be embraced therein.

I claim:
1. An aircraft comprising:
    an annulus;
    first propulsion means affixed to said annulus for rotation thereof;
    a fuselage laterally located within the interior space defined by said annulus;
    second propulsion means affixed to said fuselage for propelling said fuselage, and hence said aircraft, in a selected direction; and
    electromagnetic means for coupling said annulus to said fuselage to permit spaced rotation of said annulus relative to said fuselage, one portion of said electromagnetic means concentrically spaced on and about the inner periphery of said annulus and a second portion of said electromagnetic means being coaxially spaced on and about the outer periphery of said fuselage and in a fixed relationship with said fuselage.

2. The aircraft as described in claim 1 wherein said annulus defines an airfoil having a curved upper surface and a substantially planar lower surface.

3. The aircraft as described in claim 1 wherein said annulus includes one or more retractable members to selectively increase or decrease lift upon the annulus.

4. The aircraft as described in claim 1 wherein said annulus includes fuel storage means for supplying fuel to said first propulsion means.

5. The aircraft as described in claim 1 wherein said annulus is provided with a lip about its outer periphery, said lip extending above the adjacent upper surface of said annulus.

6. The aircraft as described in claim 5 wherein said lip is beveled outwardly from top to bottom.

7. The aircraft as described in claim 1 wherein said first propulsion means includes at least one jet engine.

8. The aircraft as described in claim 7 wherein each of said engines are pivotal about a horizontal axis.

9. The aircraft as described in claim 7 wherein said first propulsion means includes a plurality of engines equidistantly spaced about said annulus.

10. The aircraft as described in claim 7 wherein each of said engines is located adjacent the outer periphery of said annulus.

11. The aircraft as described in claim 1 wherein said fuselage is substantially coaxial with said annulus.

12. The aircraft as described in claim 1 wherein said fuselage includes a plurality of laterally extending arms, said arms terminating adjacent the inner periphery of said annulus and said arms operable to support at least a portion of said electromagnetic means.

13. The aircraft as described in claim 1 wherein said fuselage defines an airfoil.

14. The aircraft as described in claim 1 wherein said fuselage includes directional control means.

15. The aircraft as described in claim 14 wherein said directional control means comprises a rudder.

16. The aircraft as described in claim 1 wherein said second propulsion means includes at least one jet engine.

17. The aircraft as described in claim 1 wherein said second propulsion means includes at least one propeller driven unit.

18. The aircraft as described in claim 1 wherein said electromagnetic means includes at least one electromagnet-track set; each electromagnet of each set being magnetically coupled to a respective track; each of said electromagnets being affixed to the fuselage or the annulus and said respective track being affixed to the other structure.

19. The aircraft as described in claim 18 wherein each of said electromagnets and a respective track are electromagnetically attracted to one another.

20. The aircraft as described in claim 18 wherein each of said electromagnets and a respective track are electromagnetically repulsed by one another.

21. The aircraft as described in claim 18 wherein said electromagnetic means includes at least two electromagnet-track sets; at least one of said sets vertically oriented and at least one of said sets laterally oriented.

22. The aircraft as described in claim 21 wherein each of said electromagnets is attracted to a respective track.

23. The aircraft as described in claim 21 wherein each of said electromagnets and a respective track are repulsed by one another.

24. The aircraft as described in claim 21 wherein each of said electromagnets are super-cooled, superconducting magnets.

* * * * *